(12) United States Patent
Rodoni et al.

(10) Patent No.: US 11,519,740 B2
(45) Date of Patent: Dec. 6, 2022

(54) SYSTEM AND METHOD FOR MANAGING WASTE SERVICES

(71) Applicant: Rubicon Technologies, LLC, Lexington, KY (US)

(72) Inventors: Philip Rodoni, Decatur, GA (US); Samantha Podgorny, Cumming, GA (US); Ryan Alexander, Sugar Hill, GA (US)

(73) Assignee: Rubicon Technologies, LLC, Lexington, KY (US)

( * ) Notice: Subject to any disclaimer, the term of this patent is extended or adjusted under 35 U.S.C. 154(b) by 306 days.

(21) Appl. No.: 16/538,772

(22) Filed: Aug. 12, 2019

(65) Prior Publication Data

US 2019/0360822 A1 Nov. 28, 2019

Related U.S. Application Data

(63) Continuation of application No. 15/853,966, filed on Dec. 26, 2017, now Pat. No. 10,378,912, which is a (Continued)

(51) Int. Cl.
*G01C 21/34* (2006.01)
*G01S 19/14* (2010.01)
(Continued)

(52) U.S. Cl.
CPC .............. *G01C 21/343* (2013.01); *G01S 5/02* (2013.01); *G01S 19/14* (2013.01); *G06Q 10/30* (2013.01); *H04W 4/023* (2013.01); *Y02W 90/00* (2015.05)

(58) Field of Classification Search
CPC ......... G01C 21/34; G01C 21/343; G01S 5/02; G01S 19/14; G06Q 10/30; G06Q 10/00; H04W 4/023; H04W 4/02
See application file for complete search history.

(56) References Cited

U.S. PATENT DOCUMENTS

| | | | |
|---|---|---|---|
| 2006/0180647 A1* | 8/2006 | Hansen | B60S 3/00 235/375 |
| 2011/0279245 A1* | 11/2011 | Hynes | G06K 17/00 340/10.42 |
| 2012/0209783 A1* | 8/2012 | Smith, Jr. | G06Q 20/123 705/308 |
| 2012/0242512 A1 | 9/2012 | Horstemeyer | |

(Continued)

OTHER PUBLICATIONS

MX/A/2019/009592, "Notice of Allowance", dated Mar. 29, 2022, 2 pages.
PCT/US2018/017526, "International Search Report and Written Opinion", dated Mar. 7, 2018, 8 pages.

*Primary Examiner* — Tan Q Nguyen
(74) *Attorney, Agent, or Firm* — Kilpatrick Townsend & Stockton, LLP; Michael Morlock

(57) ABSTRACT

A system is disclosed for managing waste services. The system may have a locating device configured to generate a signal indicative of a location of a service vehicle on a roadway, a communication device, and a controller in communication with the locating and communication devices. The controller may be configured to determine a side of the roadway at which a first target location is currently being serviced by the service vehicle, and to determine based on the signal from the locating device a proximity of the service vehicle to a second target location at which the waste services are to be performed. The second target location may be on the same side of the roadway as the first target location. The controller may also be configured to automatically provide via the communicating device an estimated time of arrival to a customer corresponding to the second target location, based on the proximity.

20 Claims, 3 Drawing Sheets

Related U.S. Application Data continuation of application No. 15/428,958, filed on Feb. 9, 2017, now Pat. No. 9,852,405.

(51) Int. Cl.
*G06Q 10/00* (2012.01)
*H04W 4/02* (2018.01)
*G01S 5/02* (2010.01)

(56) References Cited

U.S. PATENT DOCUMENTS

| | | |
|---|---|---|
| 2015/0022338 A1 | 1/2015 | Hwang et al. |
| 2015/0025790 A1 | 1/2015 | Hwang et al. |
| 2015/0038107 A1* | 2/2015 | Messerly ............... G08G 1/205 455/404.2 |
| 2015/0179076 A1 | 6/2015 | Horstemeyer |

* cited by examiner

SYSTEM AND METHOD FOR MANAGING WASTE SERVICES

CROSS-REFERENCED APPLICATIONS

The present application is a continuation of U.S. patent application Ser. No. 15/853,966, entitled System and Method for Managing Waste Services, filed on Dec. 26, 2017, and issued as U.S. Pat. No. 10,378,912, which is a continuation of U.S. patent application Ser. No. 15/428,958, entitled System and Method for Managing Waste Services, filed on Feb. 9, 2017, and issued as U.S. Pat. No. 9,852,405, the entirety of both of which are incorporated by reference herein.

TECHNICAL FIELD

The present disclosure relates generally to a management system and method, and more particularly, to a system and method for managing waste services.

BACKGROUND

Residential waste service providers typically dispatch service vehicles to customer properties according to a predetermined pickup route assigned to each service vehicle. The pickup route for each service vehicle is often designed to provide waste services (e.g., to empty waste receptacles) within a particular geographical area (e.g., a subdivision) and at a particular frequency (e.g., once per week). For example, a particular service vehicle may be tasked to service several hundred waste receptacles at closely-spaced residences within a particular subdivision on a Tuesday of every week. After completion of the waste services within that subdivision, the vehicle operator may report the completion to a back office, which updates the operator's route and an account record for each customer. Customers in the subdivision that subscribe to these waste services are then billed based on the account record.

Various issues may arise in association with service of a customer's receptacles. For example, it may be possible for the service vehicle to arrive at the customer's residence before the corresponding receptacles have been placed out for service. When this occurs, the service vehicle may be delayed while waiting for the receptacles to be placed out, or the receptacles may not be serviced at all. In another example, if the receptacles are left curbside for too long after service has been performed, the receptacles may fall over, be blown away, block the roadway, be stolen, and/or be damaged. Similarly, some neighborhoods may have regulations regarding how long the receptacles can be left curbside and, without knowing when the receptacles have been serviced, it may be difficult for the customer to know when to retrieve the receptacles. In these situations, an advance notice that service will soon be performed and/or a notice that service has just been performed may allow the subscribing customer to quickly respond to the notice (e.g., to place out the receptacle for subsequent service or to return the receptacle to a stowed location after service).

Historically, confirmation of service being performed at a particular residence was attained manually. In particular, the operator of the service vehicle would manually check off a paper list each time the service was performed, and/or provide reasons for any service that was not performed. While this approach may have been successful in some instances, it was also problematic and had disadvantages for both the service provider and the customer. In particular, the manual confirmation was tedious and drew the operator's time and attention away from the actual service being performed and/or operation of the service vehicle. In addition, the manual confirmation provided hundreds of opportunities for error during each work shift. In some situations, these errors resulted in service being reported when the service was not actually performed, allowing the customer to be billed in spite of the lack of service. And the customer was left unable to prove that service was not performed. Further, the manual confirmation did not allow for customer notification regarding a service soon to be performed or a service just performed.

The disclosed system and method are directed to overcoming one or more of the problems set forth above and/or other problems of the prior art.

Summary

In one aspect, the present disclosure is directed to a system for managing waste services. The system may include a locating device configured to generate a signal indicative of a location of a service vehicle on a roadway, a communication device, and a controller in communication with the locating and communication devices. The controller may be configured to determine a side of the roadway at which a first target location is currently being serviced by the service vehicle, and to determine based on the signal from the locating device a proximity of the service vehicle to a second target location at which the waste services are to be performed. The second target location may be on the same side of the roadway as the first target location. The controller may also be configured to automatically provide to a customer via the communicating device an estimated time of arrival corresponding to the second target location, based on the proximity.

In another aspect, the present disclosure is directed to a method for managing waste services. The method may include detecting a location of a service vehicle on a roadway, and determining a side of the roadway at which a first target location is currently being serviced by the service vehicle. The method may also include determining a proximity of the service vehicle to a second target location at which the waste services are to be performed. The second target location may be on the same side of the roadway as the first target location. The method may further include automatically providing an estimated time of arrival to a customer corresponding to the second target location based on the proximity.

In yet another aspect, the present disclosure is directed to a non-transitory computer readable medium containing computer-executable programming instructions for performing a method of waste service management. The method may include detecting a location of a service vehicle on a roadway, and determining a side of the roadway at which a first target location is currently being serviced by the service vehicle. The method may also include determining a proximity of the service vehicle to a second target location at which the waste services are to be performed. The second target location may be on the same side of the roadway as the first target location. The method may further include automatically providing an estimated time of arrival to a customer corresponding to the second target location based on the proximity. The method may additionally include determining that the waste services have been completed at the second target location, and automatically alerting the customer corresponding to the second location that the waste services have been completed.

DETAILED DESCRIPTION

Figure 1:
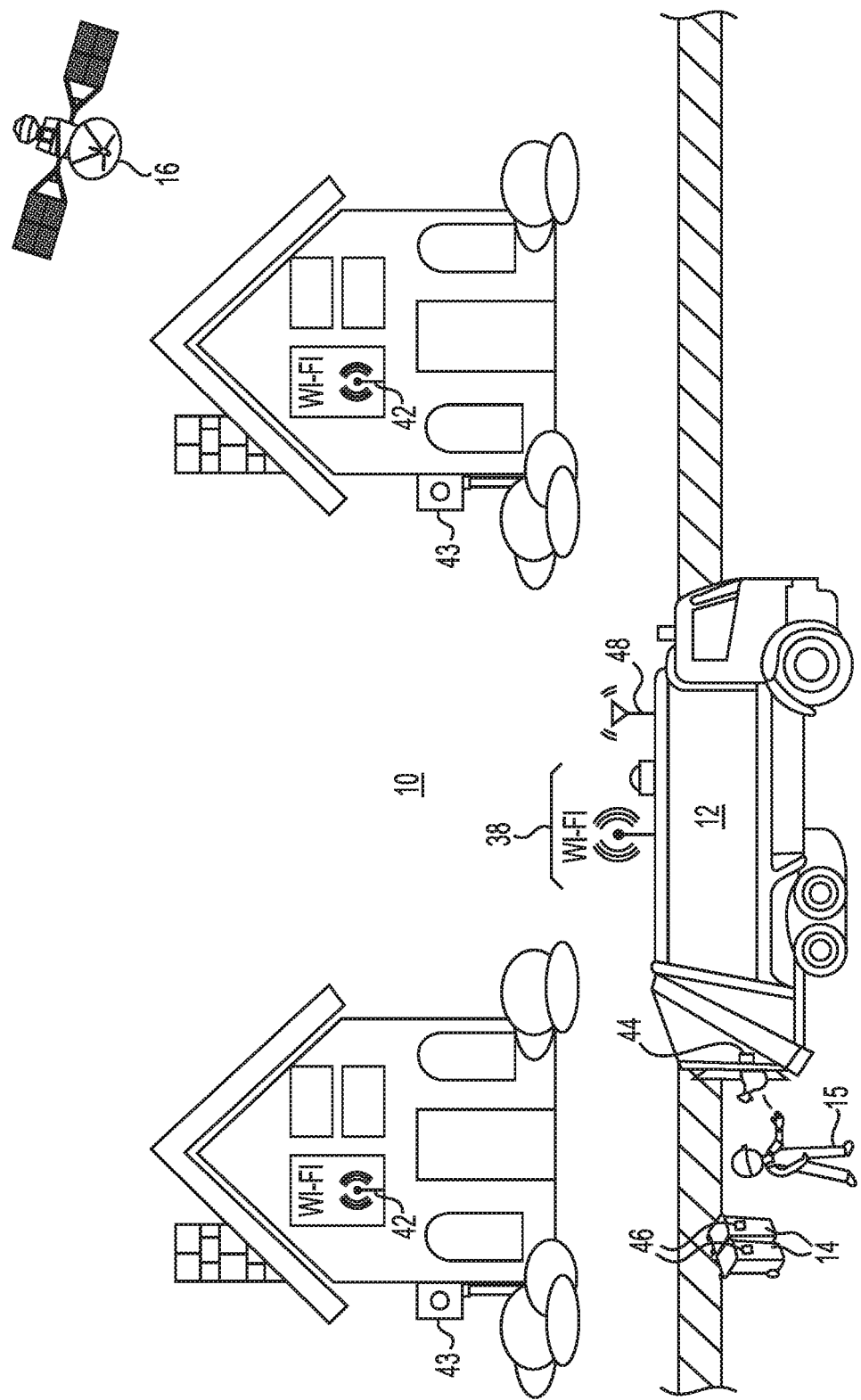
FIG. 1 is a perspective illustration of an exemplary disclosed waste management environment.

FIG. 1 illustrates an exemplary waste management environment ("environment") 10, at which one or more service vehicles 12 are providing waste services. Environment 10 may include any number of retail stores, factories, government buildings, residential addresses, or other locations having one or more receptacles 14 that require the service of vehicle 12. The service may include, for example, the removal of waste materials from inside of receptacle 14, the replacement of receptacle 14, and/or the placement of new or additional receptacles 14.

Vehicle 12 may embody a haul truck (and/or a trailer that is attachable to the haul truck), which includes or otherwise carries a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch. For example, management personnel 15 may be able to manually empty receptacles 14 into the storage compartment of a rear-hatch vehicle 12. In another example, vehicles 12 may include mechanical, electrical, and/or hydraulic systems configured to automatically grasp, lift, tilt, shake, and thereby empty receptacles 14 into vehicle 12 via a top-hatch. In yet another example, some tasks (e.g., grasping) may be completed manually and other tasks (e.g., lifting, tilting, and shaking) may be completed with the assistance of the mechanical, electrical, and/or hydraulic systems via a side-hatch of vehicle 12. In a final example, receptacle 14 may simply be loaded (e.g., manually, automatically, or semi-automatically) together with the waste contents onto vehicle 12 and transported away for emptying at another location.

As each vehicle 12 services receptacles 14 within environment 10, the motions of vehicle 12 and/or management personnel 15 that operate vehicle 12 may be monitored. For example, a satellite 16 or other tracking device may communicate with an onboard controller 30 (shown only in FIG. 2) to monitor the movements of vehicle 12 and the associated changes made to environment 10 (e.g., pickup, transporting, dumping, placing, etc.). As will be explained in more detail below, onboard controller 30 may facilitate management of service activities performed within environment 10 based on the tracked movements of vehicle 12.

Onboard controller 30 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. In some embodiments, onboard controller may be carried by the operator and/or other management personnel 15. For example, onboard controller 30 could be embodied as a smartphone, tablet, or other personal computing device.

Figure 2:
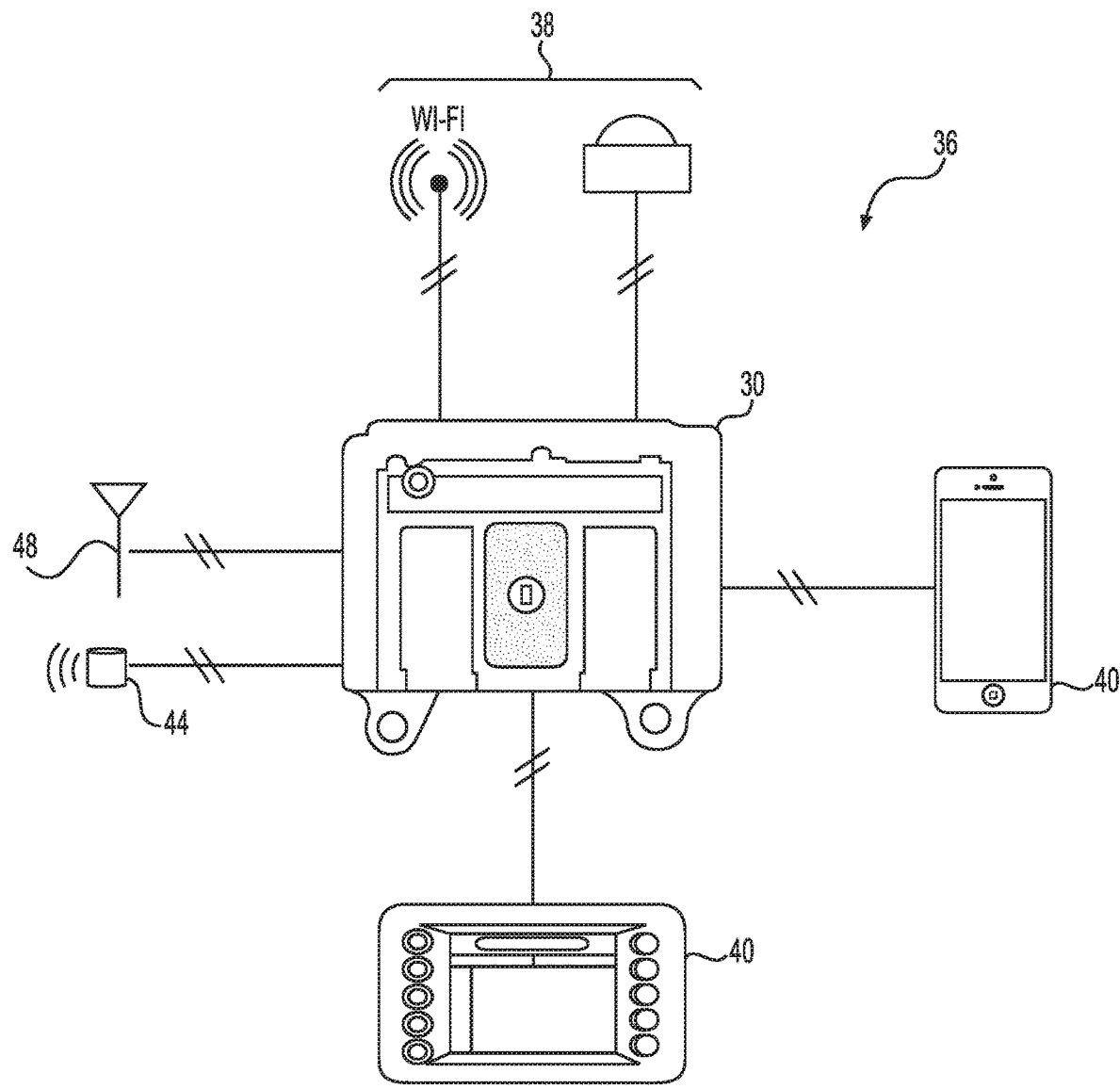
FIG. 2 is a diagrammatic illustration of an exemplary disclosed system that may be used to manage the environment of FIG. 1.

As shown in FIG. 2, onboard controller may form a portion of a waste management system ("system") 36 that is configured to track, assist, and/or control movements of service vehicle(s) 12 (shown only in FIG. 1). In addition to onboard controller 30, system 36 may also include at least one locating device 38 and an input device 40 mounted or otherwise located onboard each service vehicle 12. Onboard controller 30 may be in communication with each of these other components and configured to determine, based on signals from these components and based on other known information stored in memory (or received from a back office), the location of each service vehicle 12 and characteristics and locations of receptacles 14 being moved by and/or in a vicinity of each service vehicle 12.

In one embodiment, locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver (shown on the right in FIGS. 1 and 2) configured to communicate with satellites 16 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. Based on the signals generated by locating device 38 and based on known kinematics of service vehicle 12, onboard controller 30 may be able to determine in real or near real time, the position, heading, travel speed, acceleration, and orientation of service vehicle 12. This information may then be used by onboard controller 30 to update the locations and conditions of service vehicle(s) 12 and/or receptacles 14 in an electronic map or database of environment 10.

In another embodiment, locating device 38 may be configured to generate signals indicative of a proximity of service vehicle 12 to a target location (e.g., at location at which waste services are to be performed) with environment 10. For example, locating device 38 may embody an electronic receiver (shown on the left in FIGS. 1 and 2) configured to communicate with any number of local transmitters (e.g., Wireless transmitters 42 based at target locations to be serviced by vehicle 12—shown only in FIG. 1, wireless utility meter transmitters 43, or other types of transmitters). Locating device 38 may receive and analyze signals from each transmitter 42, 43 to determine a unique identification of transmitter 42, 43 (e.g., the owner and/or address of transmitter 42, 43). Based on the signals received by locating device 38 (e.g., based on a strength of the signals generated by transmitter 42, 43) and based on known kinematics of service vehicle 12, onboard controller 30 may be able to determine in real or near real time a distance of service vehicle 12 from transmitter 42, 43. This information may then be used by onboard controller 30 to update the locations and conditions of service vehicle(s) 12 and/or receptacles 14 in an electronic map or database of environment 10.

It is contemplated that system 36 may include both types of locating devices 38 (e.g., the satellite based and the local transmitter devices), if desired. In this example, the satellite based device may provide a general vicinity of service vehicle 12, while the local transmitter device may correlate the current location of service vehicle 12 to a particular customer (i.e., a particular target location) based on proximity.

Input device 40 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about receptacle 14 and the waste engaged by, loaded into, or otherwise processed by service vehicle 12. The information may be input in any number of ways, for example via a cab-mounted touch screen interface, via one or more buttons, via a keyboard, via speech recognition, via a camera, via a mobile device (e.g., a smartphone or tablet) carried by the operator, or in another manner known in the art. In addition to receiving manual input from an operator, input device 40 may also be capable of displaying information, for example the electronic map of environment 10, instructions, scheduling, routing, receptacle information (e.g., ID, configuration, location, weight, etc.), payload information (e.g., weight and/or volume), etc.

In some embodiments, input device 40 may be configured to execute an application. For example, when input device 40 is a mobile device (for example a smartphone), the application can be a mobile app ("app"). An app is an abbreviated term for a "software application", which is downloadable to and executable by a mobile device (e.g., a laptop, a smart phone, or a tablet). The disclosed waste management app can provide a graphical user interface (GUI) configured to display information about a waste service to the operator (e.g., management personnel 15) of service vehicle 12, to receive input from the operator regarding a completed or incomplete service activity, to transmit the operational data to onboard controller 30, to receive and display information about a current operation, etc.

Onboard controller 30 may be configured to manage communications between other onboard components (and, in some instances, between onboard and offboard components). For example, onboard controller 30 may receive signals from locating device(s) 38 and input device 40, and correlate the signals, filter the signals, buffer the signals, record the signals, or otherwise condition the signals.

Onboard controller 30, based on the information received from the other devices located onboard service vehicle 12, can be configured to execute instructions stored on computer readable medium to perform methods of waste service management at environment 10. For example, onboard controller 30 may be configured to determine when service vehicle 12 is close (e.g., with a given physical or temporal proximity) to a target location at which waste services are to be performed, detect performance of the waste services, and create a record of the performance that is stored in the memory of controller 30.

Although detection of the general location of vehicle 12 on a particular roadway may be helpful in some situations (e.g., when no other target locations are nearby), it may be difficult to determine exactly which target location is being serviced when multiple target locations are in close proximity. For example, when two target locations are located at opposing sides of the roadway on which service vehicle 12 is detected, it may be difficult to automatically determine which target location (e.g., which side of the roadway) is currently being serviced by vehicle 12. Controller 30 may be configured to make this determination in any of several different ways. For example, controller 30 may determine the side of the roadway being serviced based on the travel direction of vehicle 12 (e.g., as provided by locating device 38). In particular, controller 30 may determine that the right side (left side in some non-U.S. countries) of the roadway (e.g., as viewed from the operator's perspective and relative to the tracked travel direction) is always the side being serviced. In another example, controller 30 may determine the side of the roadway being serviced based on a strength of the wireless signal received by locating device 38 (e.g., the stronger signal may be generally associated with the side of the roadway being serviced). In another example, the operator may provide manual input via device 40 regarding the side of the roadway being serviced. In yet another example, an additional sensor (e.g., an RFID or another type of reader) 44 may be located on vehicle 12 and configured to detect a corresponding tag 46 placed on each receptacle 14, thereby identifying the address (and/or the corresponding side of the roadway) being serviced when receptacle 14 is brought near sensor 44. Other methods (e.g., camera vision, curbside RADAR detection, LIDAR detection, etc.) of detecting the side of the roadway being serviced (and/or location/proximity of vehicle 12 to a particular location) may also or alternatively be implemented.

Controller 30 may be configured to generate any number of different notices in response to vehicle location detection and detection of the side of the roadway currently being serviced by vehicle 12. For example, a customer associated with an upcoming target location (e.g., a customer located on the same side of the roadway being serviced) may be notified (e.g., via an onboard communication device 48) of an estimated time of arrival (ETA) and service. This notification may function as a reminder to the customer to place receptacles 14 curbside. Likewise, the customer may be notified after their receptacles 14 have been serviced (e.g., as confirmed via RFID reader 44, input device 40, location device 38, and/or another mechanism), allowing the customer to immediately return receptacles 14 to their stowed locations. In some situations, the notification(s) may be routed via communication device 48 directly to receptacles 14, allowing receptacles 14 to place themselves curbside and/or return themselves to the stowed locations.

Communication device 48 may be configured to facilitate communication between onboard controller 30 and the other onboard components, the customer (e.g., the customer's smart phone, tablet, and/or computer), and/or receptacles 14. Communication device 48 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. Other means of communication may also be possible.

Figure 3:
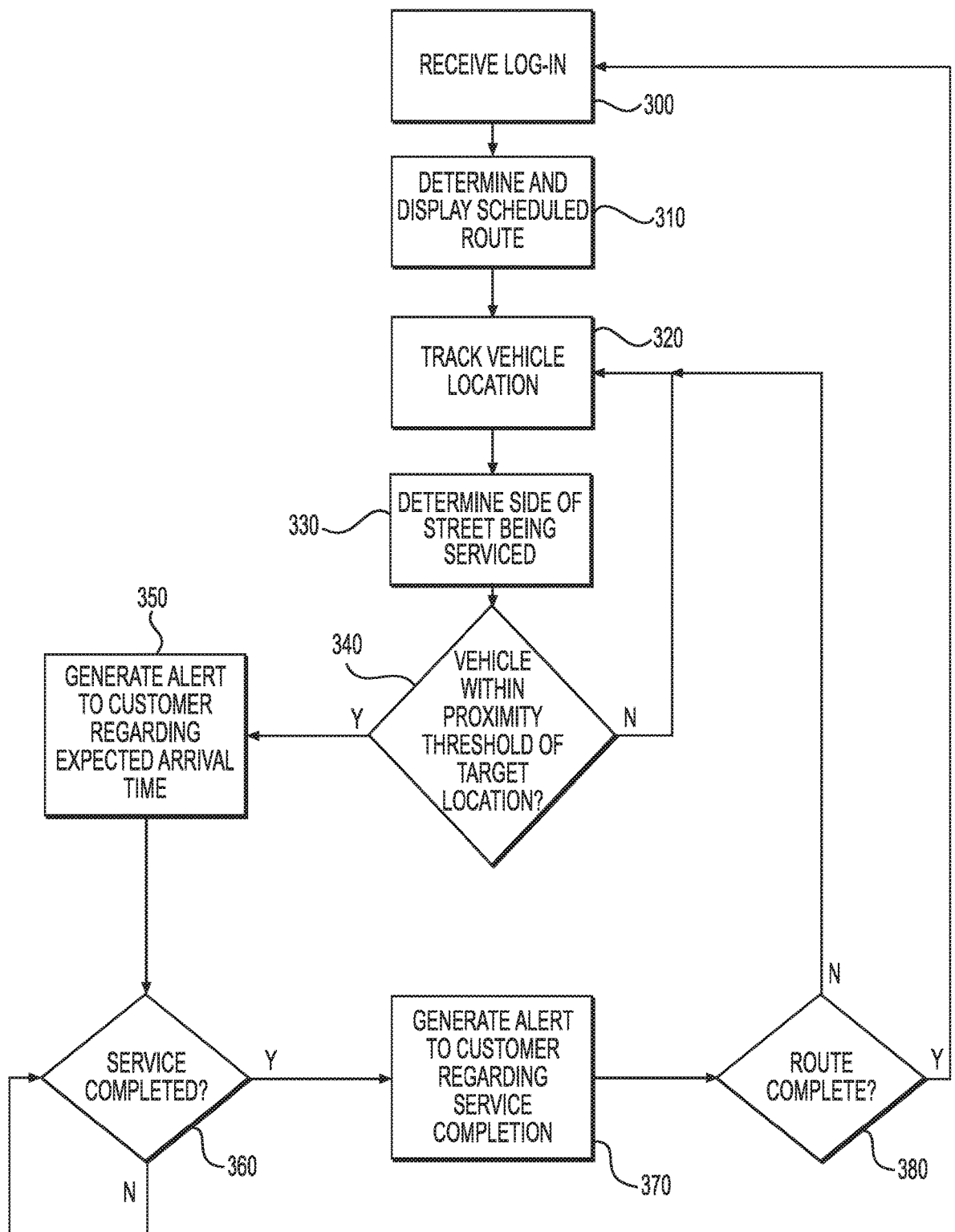
FIG. 3 is a flowchart illustrating an exemplary disclosed method of managing waste services that may be performed by the system of FIG. 2.

An exemplary process of waste service management that may be performed by onboard controller 30 is illustrated in FIG. 3 and will be explained in more detail in the following section to further illustrate the disclosed concepts.

INDUSTRIAL APPLICABILITY

The disclosed system and method may be applicable to the waste service industry, where efficient management of waste services can affect profitability of a service provider. The disclosed system and method may automatically detect the location of a service vehicle on a particular roadway, a proximity to a service location, and/or which side of the roadway is currently being serviced. This information may then be used, in combination with routing information, to alert customers of an approximated ETA, thereby providing the customers with a reminder to place their receptacles curbside. This information may also be used to alert customers after their receptacles have been serviced, so that the receptacles may be returned to their stowed locations. The disclosed method will now be explained in detail with reference to FIG. 3.

As seen in FIG. 3, the method implemented by onboard controller 30 may begin when a vehicle operator (e.g., management personnel 15) logs into the disclosed system (Step 300). During this login, the operator may provide, for example, an identification of the operator and/or of the particular service vehicle 12 that will be driven by the operator for the given work shift. Onboard controller 30 may then determine and display a route of target locations that the operator should service during the work shift (Step 310). In some instances, the login and/or route may be determined automatically by onboard controller 30, for example based on the service vehicle identification, the operator identification, the day of the week, a detected travel pattern of service vehicle 12, or another similar factor. In other instances, the route may be manually selected (e.g., by the operator and/or a supervisor) from among a plurality of available routes. Display of the route may include, among other things, a listing of the target locations, directions to the target locations, a map of the target locations, service information about each target location (e.g., an expected number and/or size of receptacles 14 at each target location), and/or a schedule of when each target location should be serviced.

After receiving the route (e.g., as electronic data received from a back office and stored locally inside input device 40), the operator may drive service vehicle 12 toward a target location listed first in the route. During this travel, onboard controller 30 may track the location of service vehicle 12 (Step 320) to determine an approximate position of service vehicle 12 on a specific roadway, including determining a side of the roadway currently being serviced by vehicle 12 (Step 330). The approximate position of service vehicle 12 may be determined based on signals generated by locating device(s) 38 and/or transmitters 42, 43. The side of the roadway currently being serviced by vehicle 12 may be determined based on the detected travel direction of vehicle 12 (e.g., as provided by locating device(s) 38) and a default side of the road normally serviced relative to the travel direction, based on a strength of the wireless (e.g., Wi-Fi and/or wireless utility) signal detected by locating device 38, based on manual input received via device 40, based on photo-recognition, and/or based on input from sensor 44 that was generated during servicing of particular receptacles 14.

Controller 30 may then compare the approximate position of service vehicle 12 to other target locations in the same route and located on the same side of the roadway as the side currently being serviced to determine if any of the target locations are within a threshold proximity (Step 340). When controller 30 determines that service vehicle 12 is not within the threshold proximity to any of the target locations on the same side of the roadway (Step 340:N), control may loop back to step 320.

However, when controller 30 determines that service vehicle 12 is within the threshold proximity to a target location that is on the same side of the roadway currently being serviced (Step 340:Y), controller 30 may generate a notice directed to that target location regarding an approximate ETA (Step 350). In particular, controller 30 may generate an electronic alert (e.g., a text message, an email, etc.) letting the corresponding customer know that service vehicle 12 will be arriving within an approximated window of time and that the customer should make sure their receptacles 14 have been placed curbside. As described above, in some embodiments, the electronic alert could be sent directly to receptacles 14, causing receptacles 14 to place themselves curbside.

As vehicle 12 nears each target location, controller 30 may determine if the required service has been performed (Step 360). This service may be confirmed in any number of different ways. For example, unless otherwise noted (e.g., unless manual input to the contrary is received), controller 30 may determine that service is always completed each time a target location is passed by. In another example, signals generated by reader 44 (or another onboard sensor) may be used to detect that service has been completed. Once controller 30 concludes that service at a particular target location has been completed (Step 360:Y), controller 30 may generate another electronic notice directed to the corresponding customer (Step 370). In particular, controller 30 may generate an electronic alert (e.g., a text message, an email, etc.) letting the corresponding customer know that service has been completed and that vehicle 12 has left the location. This alert may serve as a reminder that the customer should return their receptacles 14 to their stowed locations. As described above, in some embodiments, the electronic alert could be sent directly to receptacles 14, causing receptacles 14 to return themselves to their stowed locations.

After generating the appropriate notice for the target location (i.e., after completing Step 370), onboard controller 30 may determine if the route assigned to service vehicle 12 has been completed (Step 380). In particular, when the target location just serviced (or passed by without servicing) was the last target location in the assigned route, the route may be considered complete and control may return to Step 300. However, when the target location just serviced (or passed by without servicing) was not the last target location in the assigned route, the route may be considered incomplete and control may return to Step 320.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing waste services comprising:
   a processor configured to:
      receive route data associated with a scheduled route of a waste vehicle;
      receive location data associated with a present location on the scheduled route;

determine a side of a street on the scheduled route;
determine a first customer near the present location;
transmit a first message to the first customer and a waste receptacle of the first customer, wherein the waste receptacle adjusts position based on the first message;
determine that the waste vehicle has collected waste from the waste receptacle of the first customer; and
transmit a second message to the first customer and to the waste receptacle, wherein the waste receptacle adjusts position based on the second message.

2. The system of claim 1, wherein the first message comprises an estimated time of arrival.

3. The system of claim 2, wherein the estimated time of arrival is calculated based in part on the location data.

4. The system of claim 2, wherein the estimated time of arrival is calculated based in part on the scheduled route.

5. The system of claim 1, wherein the second message comprises a confirmation that the waste vehicle has collected waste from the first customer.

6. The system of claim 1, wherein the processor is further configured to:
determine a second location;
determine a second customer near the second location;
transmit a third message to the second customer;
determine that the waste vehicle has collected waste from the second customer; and
transmit a fourth message to the second customer.

7. The system of claim 1, wherein the processor is further configured to receive a signal from an RFID Reader configured to read an RFID associated with a waste receptacle.

8. The system of claim 7, wherein the processor is further configured to transmit the second message based in part on data stored in the RFID associated with the waste receptacle.

9. The system of claim 1, wherein the processor is further configured to determine the side of a roadway based in part on data received from an optical sensor.

10. The system of claim 1, wherein the processor is further configured to determine that the waste vehicle has collected waste from the first customer based in part on data received from an optical sensor.

11. A method for managing waste services comprising:
receiving route data associated with a scheduled route of a waste vehicle;
receiving location data associated with a present location on the scheduled route;
determining a side of a street on the scheduled route;
determining a first customer near the present location;
transmitting a first message to the first customer and a waste receptacle of the first customer, wherein the waste receptacle adjusts position based on the first message;
determining that the waste vehicle has collected waste from the waste receptacle of the first customer; and
transmitting a second message to the first customer and to the waste receptacle, wherein the waste receptacle adjusts position based on the second message.

12. The method of claim 11, wherein the first message comprises an estimated time of arrival.

13. The method of claim 12, wherein the estimated time of arrival is calculated based in part on the location data.

14. The method of claim 13, wherein the estimated time of arrival is calculated based in part on the scheduled route.

15. The method of claim 11, wherein the second message comprises a confirmation that the waste vehicle has collected waste from the first customer.

16. The method of claim 11, further comprising:
determining a second location;
determining a second customer near the second location;
transmitting a third message to the second customer;
determining that the waste vehicle has collected waste from the second customer; and
transmitting a fourth message to the second customer.

17. The method of claim 11, further comprising receiving a signal from an RFID Reader configured to read an RFID associated with a waste receptacle.

18. The method of claim 17, further comprising transmitting the second message based in part on data stored in the RFID associated with the waste receptacle.

19. The method of claim 11, further comprising determining the side of a roadway based in part on data received from an optical sensor.

20. The method of claim 11, further comprising determining that the waste vehicle has collected waste from the first customer based in part on data received from an optical sensor.

* * * * *